United States Patent
Rosenblum et al.

(10) Patent No.: US 11,640,438 B1
(45) Date of Patent: May 2, 2023

(54) METHOD AND SYSTEM FOR AUTOMATED SMART LINKING WITHIN WEB CODE

(71) Applicant: MH SUB I, LLC, El Segundo, CA (US)

(72) Inventors: Joseph A. Rosenblum, Santa Monica, CA (US); James D. Keating, Marina del Rey, CA (US); Marjo Fernandez Mercado, Los Angeles, CA (US); Meysam Golmohammadi, Los Angeles, CA (US)

(73) Assignee: MH SUB I, LLC, El Segundo, CA (US)

( * ) Notice: Subject to any disclaimer, the term of this patent is extended or adjusted under 35 U.S.C. 154(b) by 404 days.

(21) Appl. No.: 16/796,574

(22) Filed: Feb. 20, 2020

(51) Int. Cl.
| | | |
|---|---|---|
| G06F 17/00 | (2019.01) | |
| G06F 16/955 | (2019.01) | |
| G06N 20/00 | (2019.01) | |
| G06F 16/958 | (2019.01) | |
| G06Q 30/0242 | (2023.01) | |
| G06Q 30/0241 | (2023.01) | |

(52) U.S. Cl.
CPC ........ *G06F 16/9558* (2019.01); *G06F 16/958* (2019.01); *G06N 20/00* (2019.01); *G06Q 30/0246* (2013.01); *G06Q 30/0277* (2013.01)

(58) Field of Classification Search
CPC ... G06F 16/9558; G06F 16/958; G06N 20/00; G06Q 30/0246; G06Q 30/0277
USPC ........................................... 715/208; 707/707
See application file for complete search history.

(56) References Cited

U.S. PATENT DOCUMENTS

| | | | | |
|---|---|---|---|---|
| 7,788,265 | B2 * | 8/2010 | Morscher | G06F 16/353 707/956 |
| 7,917,496 | B2 * | 3/2011 | King | G06F 16/313 707/713 |
| 8,255,786 | B1 * | 8/2012 | Gattani | G06F 16/955 715/208 |
| 9,189,514 | B1 * | 11/2015 | Myslinski | G06Q 50/01 |
| 9,262,770 | B2 | 2/2016 | Yu et al. | |
| 9,489,350 | B2 * | 11/2016 | Crochet | G06F 40/194 |
| 2007/0038610 | A1 * | 2/2007 | Omoigui | H04L 67/02 |

(Continued)

OTHER PUBLICATIONS

Anonymous, Good Times with inbound links, Google Search Central Blog, Oct. 2008 (Year: 2008).*

*Primary Examiner* — Stephen S Hong
*Assistant Examiner* — Matthew J Ludwig
(74) *Attorney, Agent, or Firm* — Rutan & Tucker, LLP

(57) ABSTRACT

A method for inserting links to one or more webpages of a website is disclosed. The computerized method includes operations of detecting a first set of keywords for a first webpage of the website, determining a second set of keywords for webpages external to the website, determining, for the first webpage, a set of intersection keywords in both (i) the first set of keywords, and (ii) the second set of keywords, and generating first intersection keyword:link pairings for each intersection keyword of the first webpage. The method may also include inserting a code module into web code of the first webpage, the code module including the first intersection keyword:link pairings. The method may include determining one or more of the intersection keywords in content of the first webpage, and replacing each intersection keyword detected in the content of the first webpage with a link from the first intersection keyword:link pairings.

20 Claims, 10 Drawing Sheets

(56) References Cited

U.S. PATENT DOCUMENTS

| | | | |
|---|---|---|---|
| 2007/0073678 A1* | 3/2007 | Scott | G06F 16/374 |
| | | | 707/999.005 |
| 2007/0174255 A1* | 7/2007 | Sravanapudi | G06Q 30/02 |
| 2007/0203789 A1* | 8/2007 | Jain | G06Q 30/00 |
| | | | 705/30 |
| 2009/0240674 A1* | 9/2009 | Wilde | G06F 16/957 |
| | | | 707/999.005 |
| 2009/0327402 A1* | 12/2009 | Bernstein | H04L 67/02 |
| | | | 709/203 |
| 2010/0042487 A1* | 2/2010 | Barazani | G06Q 30/02 |
| | | | 709/224 |
| 2010/0049682 A1* | 2/2010 | Chow | G06Q 30/0631 |
| | | | 706/46 |
| 2020/0265011 A1* | 8/2020 | Liu | G06F 16/185 |

* cited by examiner

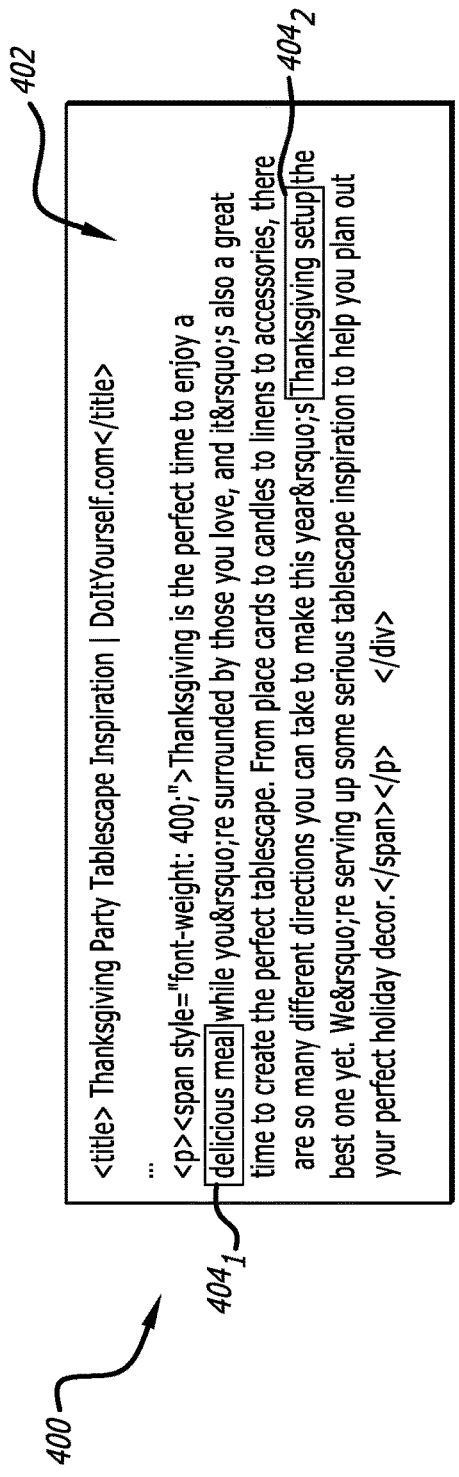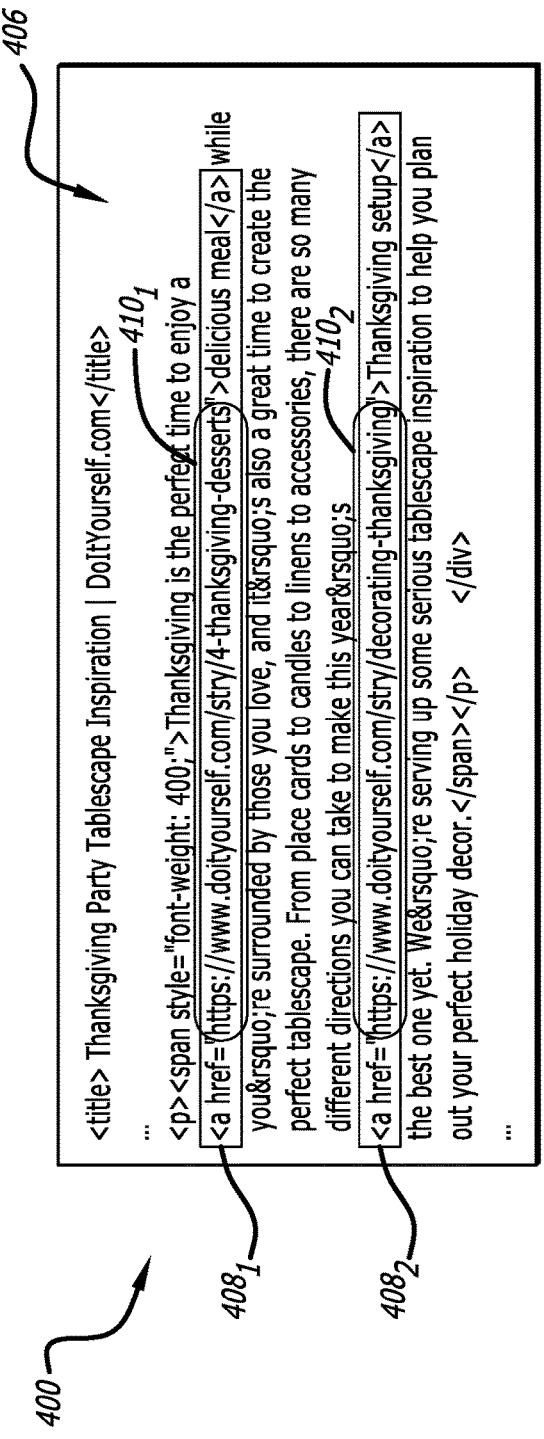
FIG. 4A
FIG. 4B

US 11,640,438 B1

METHOD AND SYSTEM FOR AUTOMATED SMART LINKING WITHIN WEB CODE

FIELD

Embodiments of the disclosure relate to the field of search engine optimization. More specifically, one embodiment of the disclosure relates to a system for automatically altering code of a webpage to intelligently insert links to other webpages based on keyword searches and optimization.

GENERAL BACKGROUND

Since the creation of the World Wide Web, cataloging publicly available webpages has always been a difficult task. However, search engines have sought to automate the process. Search engines consist of bots (or "spiders"), an index (e.g., a catalog) and an interface. The spiders "crawl" webpages on the internet by following links on webpages. When a spider reaches a new webpage, i.e., one that was not previously indexed, the spider causes the webpage to be indexed. The interface enables a human user to query the index of the search engine using words or terms and the search engine returns indexed webpages based on the query. Specifically, the search engine utilizes keywords in the query and the indexed webpages in order to return relevant webpages.

From the time webpages started to incorporate advertisements, the cost to place an ad on a webpage has been affected by where each webpage falls in a search engine result (e.g., ranking). Specifically, webpages may be ranked according to various factors, e.g., page visits and backlinks, with more page visits and backlinks typically resulting in a higher ranking compared to other webpages. The higher ranking webpages often provide a higher value for advertisers based on the higher visibility of their ads from the higher number of page visits. Based on this, many website owners began to take part in a process of search engine optimization, which is directed at affecting the ranking of a webpage on a search engine's unpaid results. As search engine results are based on, inter alia, keywords appearing on the webpage and backlinks of the webpage, search engine optimization may include editing the content of a webpage to include certain links or keywords and/or increasing the number of backlinks of a webpage.

However, search engine optimization can be a labor-intensive undertaking due to the vast number of webpages typically associated with a website. Additionally, with how fast the internet is growing, continuously updating webpages with relevant links, and increasing the backlinks to a webpage, is not a project that can be handled manually. Internet users seek the webpages having content that is updated, accurate and relevant to their inquiry. Therefore, a system and method are needed that automatically updates webpages with keywords that result in an improvement of a webpage's search engine ranking. Additionally, as the number of backlinks to a webpage affects the webpage's search engine ranking, the system and method should insert links of webpages within a given website other webpages within the website in order to increase the number of backlinks to each webpage.

BRIEF DESCRIPTION OF THE DRAWINGS

Embodiments of the disclosure are illustrated by way of example and not by way of limitation in the figures of the accompanying drawings, in which like references indicate similar elements and in which:

FIG. 4A is an illustrative embodiment of web code of a webpage that is parsed in order to detect a plurality of keywords according to some embodiments;

FIG. 4B is an illustrative embodiment of the web code of FIG. 4A wherein the plurality of detected keywords have been replaced by a corresponding hyperlink according to some embodiments;

DETAILED DESCRIPTION

Figure 1:
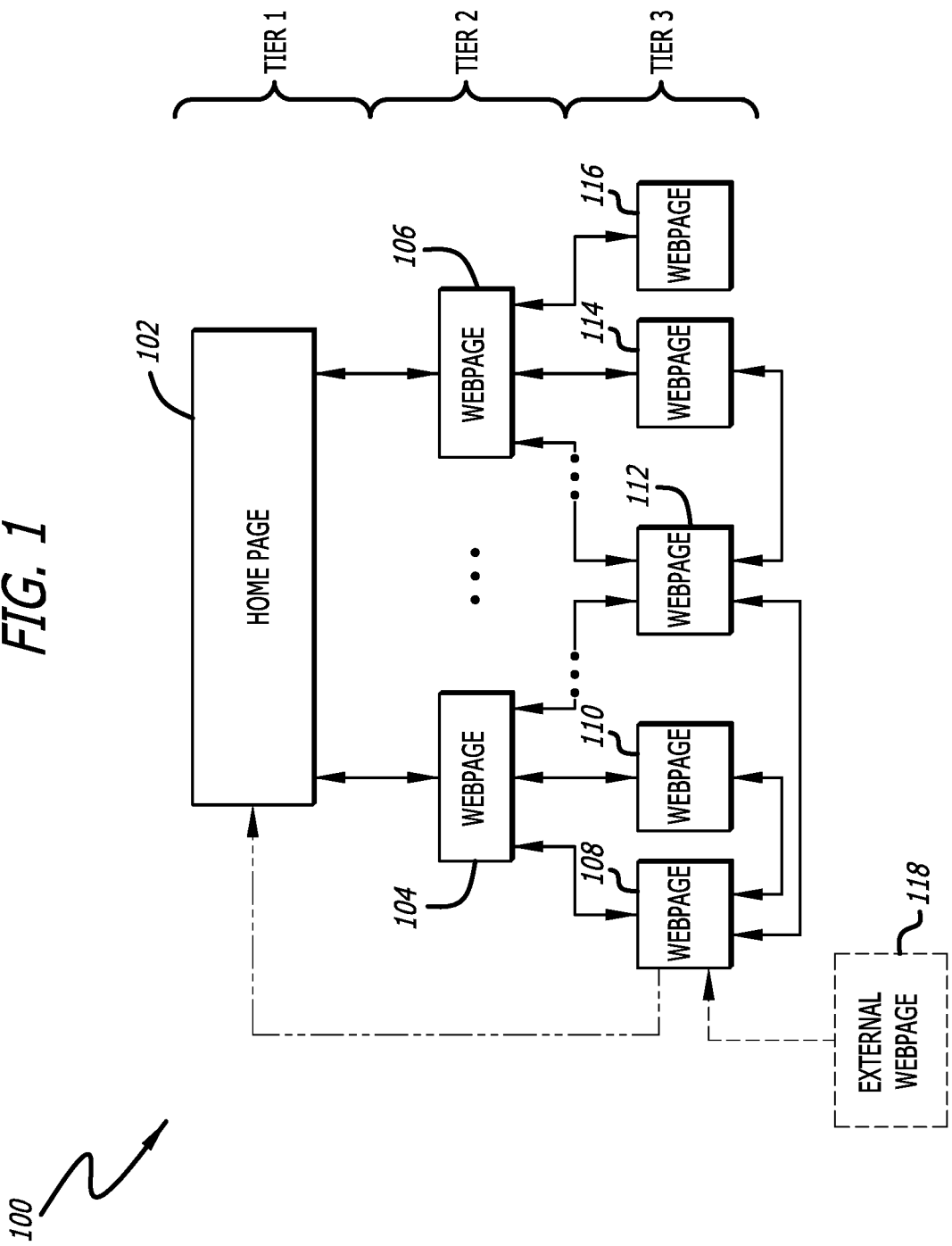
FIG. 1 is an exemplary block diagram illustrating a plurality of webpages comprising a website arranged in a hierarchical manner according to some embodiments.

Various embodiments of the disclosure are directed to a method and system for automatically altering the code of a webpage to insert links. In some embodiments, natural language processing and machine learning techniques are utilized to determine and detect keywords for each webpage of a website being analyzed. In some embodiments, the keywords for a webpage may correspond to words or phrases that appear in the content of the webpage or may be based on the content of the webpage. The detected keywords may be compared to a set of keywords of competitors' webpages that are obtained via data analytics. For each webpage of the website, a set of keywords representing an intersection of the webpage's keywords and the keywords of the competitors' webpages is determined ("intersection keywords"). As used herein, the term "competitors' webpages" refers to webpages that are external to the website being analyzed.

Following the determination of the intersection keywords, a corresponding link for each intersection keyword is determined, which results in the generation of an {intersection keyword:link} pairings for each webpage. Subsequent to the generation of the {intersection keyword:link} pairings, either of two optional steps may be performed. A first optional step includes, for each webpage of the website, inserting a code module into the web code of each webpage of the website, wherein the code module includes the webpage's {intersection keyword:link} pairing.

The second optional step includes, for each webpage of the website, parsing the webpage to determine whether the content of the webpage includes any of the webpage's intersection keywords. For each of the intersection keywords detected within the content of the webpage, the intersection keyword are replaced with the corresponding link from the {intersection keyword:link} pairings of the webpage. The link placed into the content of the webpage may be in the form of a hyperlink displayed as the replaced intersection keyword.

I. Terminology

In the following description, certain terminology is used to describe features of the invention. For example, in certain situations, the term "logic" and "component" are representative of hardware, firmware or software that is configured to perform one or more functions. As hardware, a component (or logic) may include circuitry having data processing or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC," etc.), a semiconductor memory, or combinatorial elements.

Alternatively, the component (or logic) may be software, such as executable code in the form of an executable application, an Application Programming Interface (API), a subroutine, a function, a procedure, an applet, a servlet, a routine, source code, object code, a shared library/dynamic load library, or one or more instructions. The software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., read-only memory "ROM," power-backed RAM, flash memory, phase-change memory, etc.), a solid-state drive, hard disk drive, an optical disc drive, or a portable memory device. As firmware, the executable code may be stored in persistent storage.

A "communication" generally refers to information transmitted in one or more electrical signals that collectively represent electrically stored data in a prescribed format. Each communication may be in the form of one or more packets, frames, HTTP-based transmissions, signals transmitted over telephone lines, or any other series of bits having the prescribed format. Herein, the terms "message," "communication" and "communication message" are used interchangeably. Specifically, the term "text message" refers to a communication transmitted to a phone number and transmitted via either a cellular data service provider (e.g., AT&T, Verizon, Sprint, etc.) or a set of private servers (e.g., privately owned or through cloud computing). Examples of text messages include, but are not limited or restricted to, short message service (SMS) messages and/or Apple iMessages®.

The term "computerized" generally represents that any corresponding operations are conducted by hardware in combination with software and/or firmware.

The term "webpage" generally refers to a singular document on the internet comprised of code (also referred to as "web code"). The web code may be provided in any programming language as known to those skilled in the art, examples of programming languages include HTML5 and JavaScript; however, the disclosure is not intended to be limited by these examples. A webpage (or "web page") is typically directed to a focused topic, displaying content directed to the focused topic, which may be provided in the form of an article. The information that is displayed relating to the focused topic may be referred to as "content" and may take any form such as text, video, graphics, audio, etc.

The term "website" generally refers to a collection or compilation of webpages, wherein the collection or compilation is typically directed to a broader scope of content than a single webpage. In some instances, the webpages under a single domain name as registered with the Domain Name System (DNS). Additionally, the webpages forming a website may be arranged in a hierarchical manner. For example, a "home page" or "splash page" may serve as a "head" or a "parent node" (with respect to a nodal diagram analogy). A second tier of webpages may be direct links from the home page. A third tier may include webpages that are direct links of webpages forming the second tier, wherein content displayed by webpages of the third tier is even more focused toward a single topic than webpages forming the second tier.

The term "link" generally refers to a reference to a webpage. A link may take numerous forms when rendered as part of a webpage. Examples include, but are not limited or restricted to, a word, a group of words or image. Herein, the terms "link," "hyperlink" and "Uniform Resource Locator (URL)" are used interchangeably.

The term "backlink" generally refers to an inbound link of a particular webpage. For example, a backlink of a first webpage refers to a link from a second webpage to the first webpage. A backlink may also be referred to as an "Inbound Link (IBL)."

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. Website Hierarchy Embodiment

Referring now to FIG. 1, an exemplary block diagram illustrating a plurality of webpages comprising a website arranged in a hierarchical manner is shown according to some embodiments. Although the configurations for websites are limitless, most websites are arranged in a hierarchical manner. As shown in FIG. 1, a typical website 100 includes a home page 102 that forms a first tier in the hierarchical arrangement. The home page 102 may provide a general overview as to the website 100 such as an introduction to the company that owns the website and/or provide an attention-grabbing graphic or display in order to pique the interest of a visitor. Additionally, the home page 102 may include one or more links to webpages comprising the website 100. For instance, webpages including a direct link from the home page 102 may form a second tier of webpages within the website 100, e.g., the webpages 104 and 106. FIG. 1 provides an illustration of links between the home page 102 and the webpages 104 and 106 indicating that the link is bi-directional (e.g., solid lines having arrows at either end). For example, the home page 102 may be include a link to the webpage 106 and vice versa. Although, FIG. 1 illustrates two webpages within the second tier, it should be clear to one having ordinary skill in the art that the website 100 may an unlimited number of webpages in the second tier (or throughout the website 100). The disclosure is not intended to be limited to any number of webpages comprising the website 100.

Similarly, FIG. 1 illustrates that the website 100 includes the webpages 108, 110, 112, 114 and 116 forming a third tier. Each webpage within the third tier is illustrated as including a bi-directional link to at least one webpage in the second tier. Additionally, with respect to the webpage 112, FIG. 1 illustrates that a webpage in third tier may include links from two or more webpages in the second tier. Further, FIG. 1 illustrates that a link may be present between webpages of the same tier (e.g., a link is shown between the webpages 108 and 110, both within the third tier). FIG. 1 also illustrates that the website 100 may include a unidirectional link, such as a link from the webpage 108 in the third tier to the home page 102, which simply means that the webpage 108 includes a link to the home page 102 but the home page 102 does not include a direct link to the webpage 108. Although the website 100 is shown to have three tiers, the disclosure is not intended to be so limited and one of ordinary skill in the art would understand that a website may have an unlimited number of webpages, tiers and unidirectional/bi-directional links.

FIG. 1 also illustrates that a webpage within the website may include in-bound links from external webpages, e.g., webpages not included within the website 100. As is shown, the webpage 108 being within the website 100 includes an in-bound link from the external webpage 118. As will be discussed below, in one embodiment of the disclosure, the web code of the webpages comprising the website 100 may be altered, e.g., code modules may be inserted, in order to manipulate the number of links that appear on a given webpage from the perspective of a search engine. As FIG. 1 illustrates, the links inserted to the web code may be links directed to an internal webpage (i.e., within the website 100) or to an external webpage (i.e., outside of the website 100).

III. Exemplary Organizational Flow

Figure 2A:
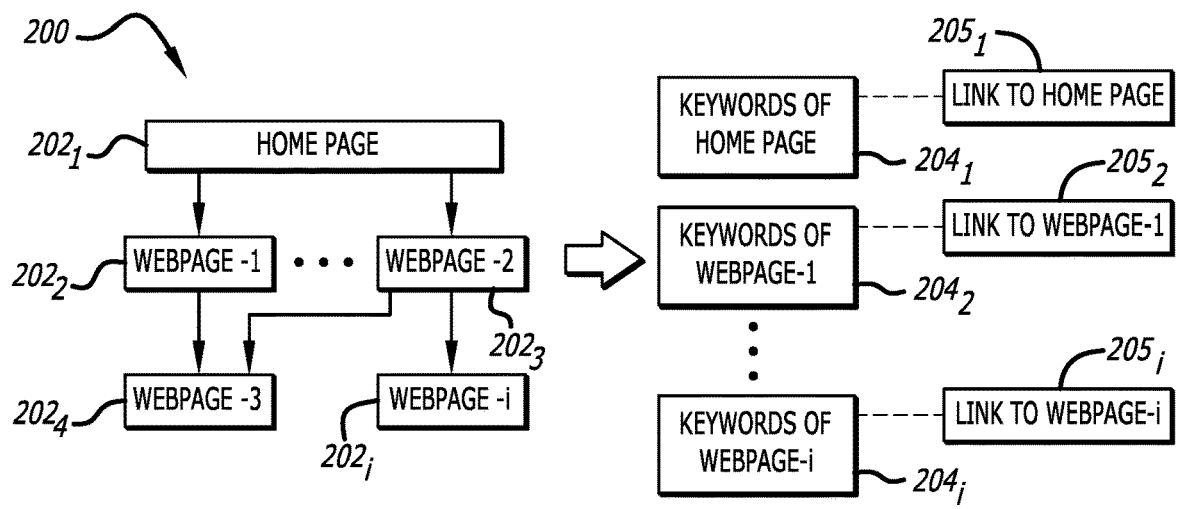
FIG. 2A is an exemplary block diagram illustrating a plurality of webpages comprising a website arranged in a hierarchical manner and a first step in the organizational flow of FIGS. 2A-2G in which keywords for each webpage are obtained according to some embodiments.
Figure 6:
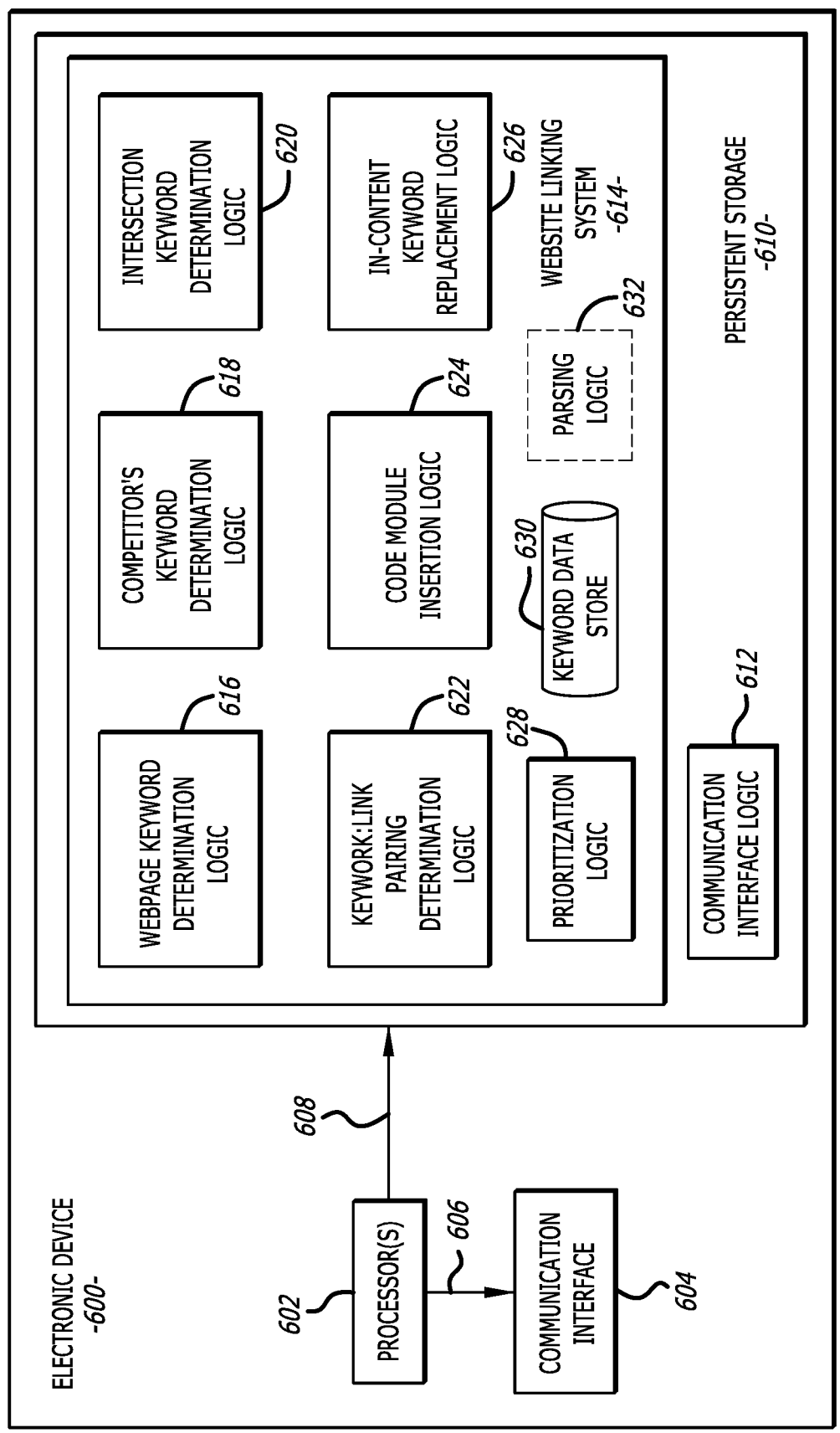
FIG. 6 is an exemplary embodiment of a logical representation of a website linking system according to some embodiments.

Referring now to FIGS. 2A-2G, an illustration of an exemplary organizational flow of operations performed by a website linking system is shown according to some embodiments. Each of the figures in FIGS. 2A-2G illustrates a particular step in the organizational flow, with each step comprising one or more operations performed by the website linking system (e.g., the website linking system 614 as illustrated in FIG. 6). Referring specifically to FIG. 2A, an exemplary block diagram illustrating a plurality of webpages comprising the website 200 arranged in a hierarchical manner and a first step in the organizational flow of FIGS. 2A-2G in which keywords for each webpage are obtained is shown according to some embodiments. FIG. 2A illustrates that for each webpage of the website 200, the website linking system determines a set of keywords within the content for each webpage and records each keyword with a link of the webpage from which the keyword was retrieved. The keyword and link may be stored as a pair in a data store such as the keyword data store 630 of FIG. 6. The keywords $205_1$-$205_i$ are seen in FIG. 2A and the pair may be described by the following: {intersection keyword: link}. In performing the step of determining a set of keywords, the website linking system may parse each webpage $202_1$-$202_i$ and store a listing of the keywords in a data store, such as the keyword data store ("data store") 626 as seen in FIG. 6. The webpages may be requested and loaded prior to searching (e.g., placed in a "loaded state") or the underlying web code (e.g., HTML code) may be parsed. In some embodiments, the website linking system may search the webpages for a predetermined list of hundreds or thousands of keywords. The predetermined list may also be stored in the data store. Alternatively, or in addition, the website linking system may utilize natural language processing and machine learning techniques to detect keywords present on each webpage. As is shown in FIG. 2A for illustrative purposes, the keywords $204_2$ correspond to webpage-1 $202_2$. FIG. 2A illustrates that a set of keywords for each webpage comprising the website 200 is determined by the website linking system. In some embodiments, as mentioned above, after extracting keywords for each webpage, each keyword is saved along with a link, i.e., an internet address or a Universal Resource Link (URL), of the corresponding webpage in a data frame (or table or excel). Each data frame may be made unique based on the column of keywords, in a way that each keyword is assigned to one or more addresses of webpages.

Figure 2B:
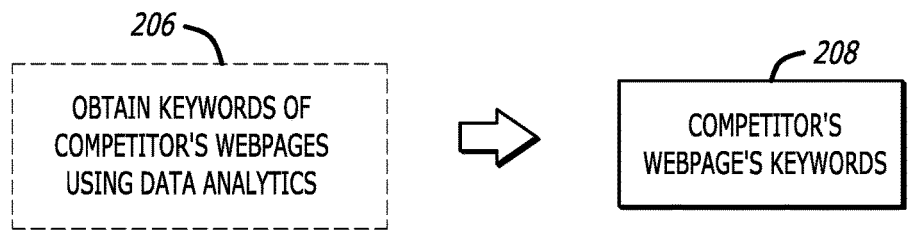
FIG. 2B is an exemplary block diagram illustrating a second step in the organizational flow of FIGS. 2A-2G in which keywords present on competitors' webpages are obtained according to some embodiments.

Referring to FIG. 2B, an exemplary block diagram illustrating a second step in the organizational flow of FIGS. 2A-2G in which keywords present on competitors' webpages are obtained is shown according to some embodiments. FIG. 2B provides an illustrative example of obtaining keywords from a competitors' webpages using data analytics (illustrated as box 206). The competitors' webpages' keywords 208 may then be stored in the data store. Additionally, keywords may be obtained for a plurality of competitors' webpages. In some embodiments, the website linking system performs similar operations as discussed above with FIG. 2A with the competitors' webpages in order to determine the keywords. In other embodiments, a third-party data analysis system may be utilized to obtain the keywords of competitors' webpages. In one embodiment, the third-party data analysis system may be, for example, SpyFu® or SEMrush®. The website linking system may obtain keywords of the competitors' webpages as well as advertising information of each keyword, including an estimated economic value for each keyword. Further, the advertising information may also include, for each keyword, the number of monthly searches, a click through rate, a cost per click (e.g., the average amount advertisers pay a search engine when someone clicks their ad for a given keyword), an estimated monthly cost (e.g., an estimate of the cost to advertise on a given keyword), etc. The advertising information may also be stored alongside the competitors' webpages' keywords 208 in the data store.

Figure 2C:
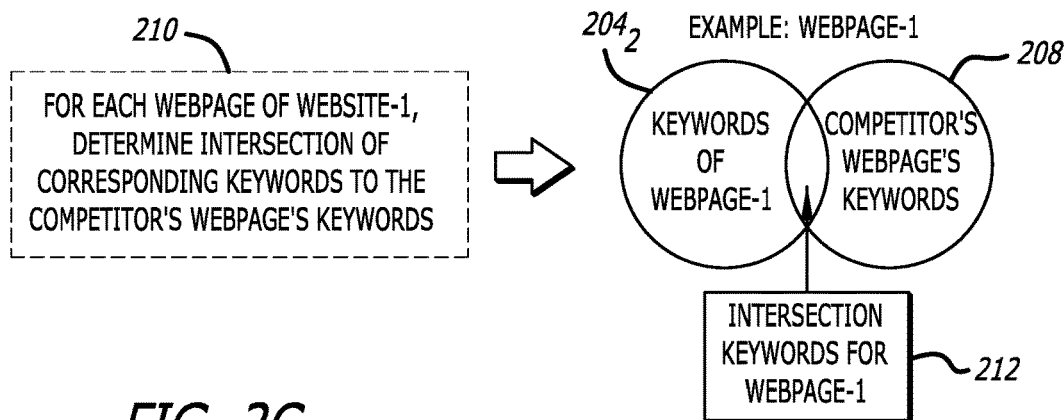
FIG. 2C is an exemplary illustration of a third step in the organizational flow of FIGS. 2A-2G in which an intersection is determined for keywords of a first webpage as seen in FIG. 1A and competitors' webpages' keywords according to some embodiments.
Figure 2D:
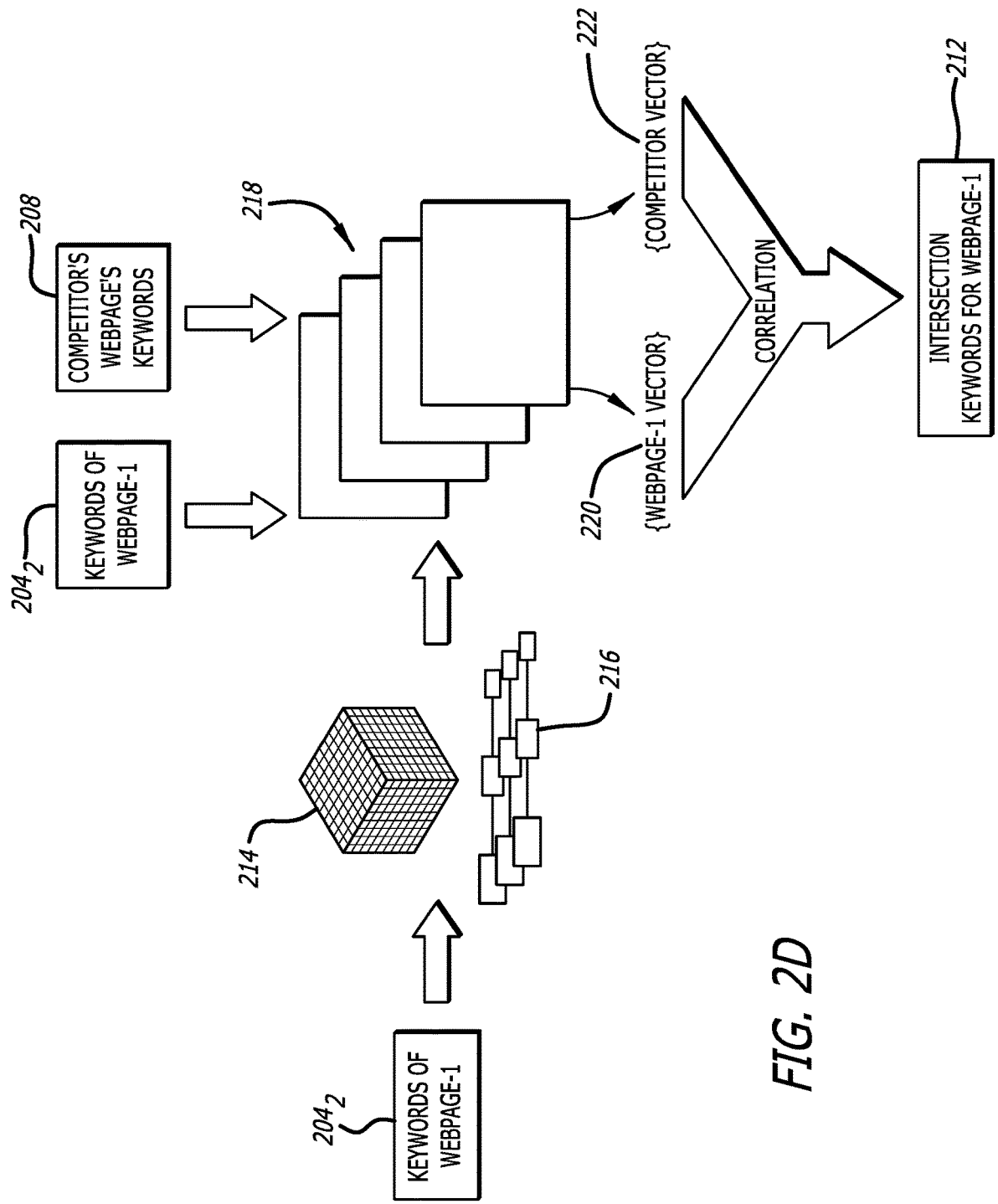
FIG. 2D is an exemplary illustration of an alternative method for performing the third step in the organizational flow of FIGS. 2A-2G in which intersection keywords are determined by way of machine learning is shown according to some embodiments.

Referring to FIG. 2C, an exemplary illustration of a third step in the organizational flow of FIGS. 2A-2G in which an intersection is determined for keywords of a first webpage as seen in FIG. 2A and competitors' webpages' keywords is shown according to some embodiments. It should be noted that FIG. 2C merely provides one embodiment of determination a set of intersection keywords. FIG. 2D illustrates an alternative embodiment. FIG. 2C provides an illustrative example of determining an intersection of the keywords $204_2$ of webpage-1 $202_2$ and the competitors' webpages' keywords 208 (illustrated as box 210). FIG. 2C provides a Venn diagram to illustrate the intersection keywords for webpage-1 $202_2$ ("intersection keywords 212"). The term "intersection keywords" generally refers to a set of keywords. In one embodiment, the determination of the intersection keywords 212 includes determining the overlap of keywords in two sets: (1) the keywords $204_2$, and (2) the competitors' webpages' keywords 208. It should be understood that the intersection is determined between the competitors' webpages' keywords and each webpage's keywords (i.e., each of the sets of keywords $204_1$-$204_i$). Additionally, the intersection includes words and/or phrases from either set of words that are similar in nature, such as phonetic matches, abbreviations and full forms of a word/phrase or synonyms. In some embodiments, logic of the website linking system includes one or more phonetic matching algorithms. In addition, in some embodiments, the website linking system utilizes predetermined rule sets, natural language processing, machine learning logic or a combination thereof in determining whether a word or phrase from the first set of keywords overlaps with a word or phrase from the second set of keywords with respect to the determination of (i) a phonetic match, (ii) a match of an abbreviation with a full form, and/or (iii) synonyms according to a rules-based system where a rule set determines synonyms according to a predetermined data store of synonym keyword pairings. The terms "the logic of the website linking system" and "the website linking system" will be used interchangeably throughout unless provided otherwise. The intersection keywords 212 may then be stored in the data store.

Referring to FIG. 2D, an exemplary illustration of an alternative method for performing the third step in the organizational flow of FIGS. 2A-2G in which intersection keywords are determined by way of machine learning is shown according to some embodiments. FIG. 2D provides an illustrative example of determining an intersection of the keywords $204_2$ of webpage-1 $202_2$ and the competitors' webpages' keywords 208 by first training, using machine learning and natural language processing methodologies, a machine learning model 214 or a Convolutional Neural Network (CNN) model 216 using the keywords $204_2$ of webpage-1 $202_2$. The trained model is represented by reference numeral 218. The trained model 218 is then applied to the keywords $204_2$ of webpage-1 $202_2$ resulting in one or more numeric representation vectors 220 for the keywords of webpage-1 $202_2$. Additionally, the trained model 218 is then applied to the competitors' webpages' keywords 208 resulting in one or more numeric representation vectors 222 for the competitors' webpages' keywords 208. Subsequently, a set of synonyms is determined according to a correlation of the keywords in the one or more numeric representation vectors 220 and the one or more numeric representation vectors 222, by finding keywords that are close to each other, wherein "closeness" may be defined by two keywords meeting or exceeding a particular correlation threshold.

Although not shown, in addition to the above described embodiments of FIGS. 2C-2D, the website linking system may determine keywords of the competitors' webpages' keywords 208 that are not present within the keywords of webpage-1 $202_2$ ("omitted keywords") and include these omitted keywords in the intersection keywords for webpage-1 212.

Figure 2E:
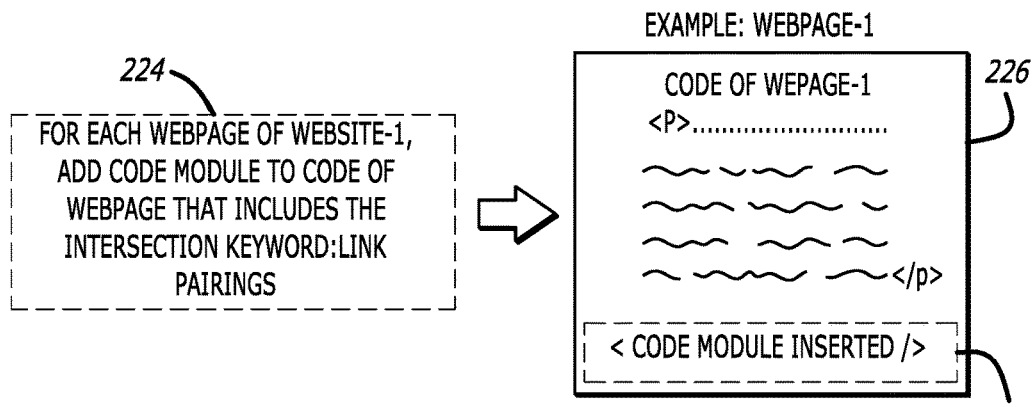
FIG. 2E is an exemplary block diagram illustrating an optional fifth step in the organizational flow of FIGS. 2A-2G in which a code module is inserted into the web code of the first webpage as seen in FIG. 1A according to some embodiments.
Figure 2F:
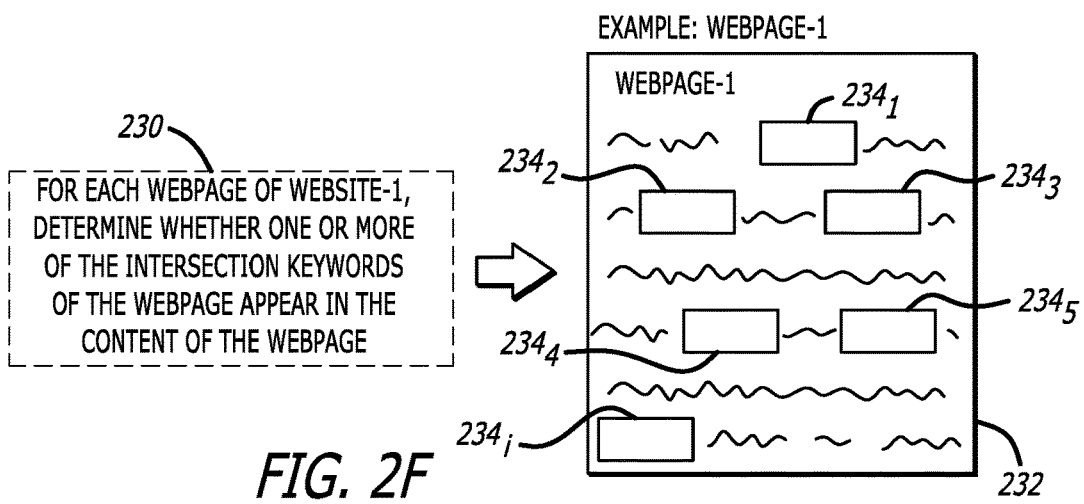
FIG. 2F is an exemplary block diagram illustrating an optional sixth step in the organizational flow of FIGS. 2A-2G in which a detection process for the intersection keywords of FIG. 2C is performed on the first webpage as seen in FIG. 1A according to some embodiments.
Figure 2G:
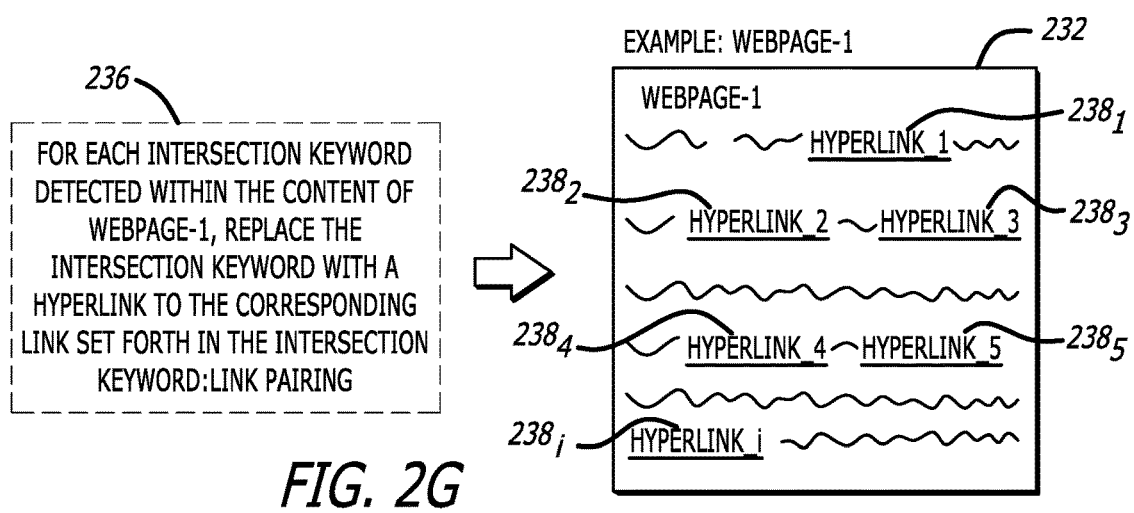
FIG. 2G is an exemplary block diagram illustrating an optional seventh step in the organizational flow of FIGS. 2A-2G in which an in-content keyword replacement process is performed on the first webpage as seen in FIG. 1A according to some embodiments.

With respect to FIGS. 2E-2G, optional steps are illustrated. Specifically, the website linking system may perform one or more of: (1) the step illustrated in FIG. 2E, and/or (2) the steps illustrated in FIGS. 2F-G. Thus, the steps of FIGS. 2F-2G are not dependent on the performance of the step of FIG. 2E. Referring now to FIG. 2E, an exemplary block diagram illustrating an optional fifth step in the organizational flow of FIGS. 2A-2G in which a code module is inserted into the web code of the first webpage as seen in FIG. 2A is shown according to some embodiments. One step of the organizational flow that may be performed by the website linking system following the determination and generation of keyword:link pairings is, for each webpage of the website 200, inserting a code module into the web code that includes the corresponding keyword:link pairings (illustrated as box 220). For example, FIG. 2E illustrates the code 222 comprising the webpage-1 $202_2$ wherein a code module 224 has been inserted into the code 222, for example, at the end of the code 222; however, the code module 224 may be inserted at any location within the code 222. One advantage of the invention is that a search engine that scrapes (e.g., crawls) the webpage-1 $202_2$ will find the intersection keywords 212 or in 208 which are intersection keywords for a webpage to newly compete with the competitor that are part of the keyword:link pairings 218 included in the code module 224. Therefore, the webpage-1 $202_2$ is more likely to appear in search results containing keywords relevant to the content of the webpage-1 $202_2$.

In addition, a second advantage of the invention is that, when a visitor loads the webpage-1 $202_2$, the visitor is presented with the keywords and corresponding links of the keyword:link pairings 218. Previously, any keywords and links would have to be established by the author or editor of the webpage-1 $202_2$ prior to publishing. However, the invention provides a manner of automatically updating the keywords and any corresponding links, e.g., with new links that may be more relevant than those that existed at the time of publishing (or were otherwise unknown to the author/editor) Additionally, authors and editors often fail to include keywords and corresponding links, or they include keywords and corresponding links that may not provide optimal value to a visitor. When a visitor is provided with an irrelevant link in the previous technology, he or she is less likely to utilize the webpage again, thereby costing the author or editor advertising or other revenue based on website/webpage visits.

Furthermore, by inserting additional links included in the code module 224, the website linking system improves the number of links to other webpages. The website linking system may include links that are internal to the website 200 thereby increasing the number of links within the website 200. The increased number of links results in an improved ranking by search engines. In addition, the code module 224 is executed upon loading of the webpage thereby providing the visitor with additional keywords and/or links the visitor may not have otherwise known about.

Referring to FIG. 2F, an exemplary block diagram illustrating an optional sixth step in the organizational flow of FIGS. 2A-2G in which a detection process for the intersection keywords of FIG. 2C is performed on the first webpage as seen in FIG. 1A is shown according to some embodiments. An alternative optional step in the organizational flow of FIGS. 2A-2G that may be performed subsequent to the determination of keyword:link pairings is, for each webpage of the website 200, determine whether one or more of the intersection keywords of the webpage are present in the content of the webpage. Specifically, the website linking system parses the loaded content 228 to detect whether any of the intersection keywords 212 are present. As an illustrative example and with reference to webpage-1 $202_2$, the loaded content 228 of the webpage-1 $202_2$ is shown having a plurality of detected keywords $230_1$-$230_i$ therein. As an alternative embodiment, the website linking system may parse the web code of each webpage.

Referring now to FIG. 2G, an exemplary block diagram illustrating an optional seventh step in the organizational flow of FIGS. 2A-2G in which an in-content keyword replacement process is performed on the first webpage as seen in FIG. 2A is shown according to some embodiments. Continuing from the discussion above referencing FIG. 2F, when the website linking system detects an intersection keyword 212 (i.e., any of the detected keywords $230_1$-$230_i$), the website linking system may replace the keyword with the corresponding link from the keyword:link pairings 218 (e.g., in the form of a hyperlink displayed as the keyword). Therefore, the links $230_1$-$230_i$ represent hyperlinks displayed as keywords, wherein each hyperlink is directed to the corresponding link within the keyword:link pairings 218. As an illustrative, non-limiting example, the loaded content 228 corresponds to the webpage-1 $202_2$, the detected keyword $230_1$ may correspond to keyword_A of the keywords $204_1$. Therefore, the hyperlink_1 $234_1$ may correspond to link_A of the keyword:link pairings 218.

The in-content keyword replacement process, when performed on a webpage, provides several advantages. For example, following the in-content replacement process, a webpage includes additional links on the webpage than were previously present, which results in a higher search engine ranking. The higher search engine ranking assists the website owner in being placed higher in search results, which leads to additional visitors to the webpage (e.g., increasing the value of ad revenue the website owner may receive). Additionally, the in-content keyword replacement process provides a visitor of the webpage added value due to the additional links included within the content that quickly and easily direct the visitor to helpful and relevant information.

Figure 3A:
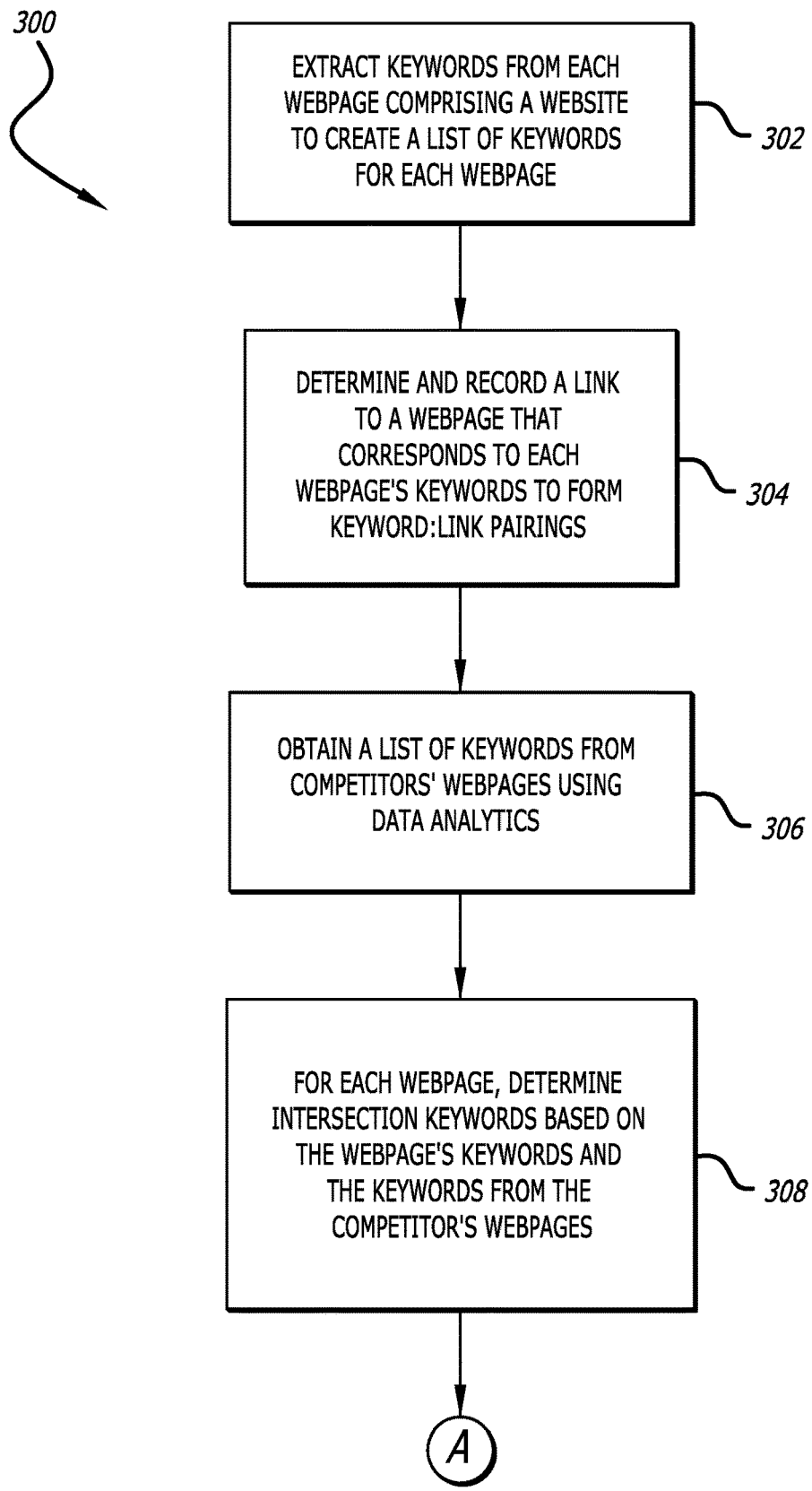
FIGS. 3A-3B is flowchart illustrating the organizational flow of FIGS. 2A-2G according to some embodiments.
Figure 3B:
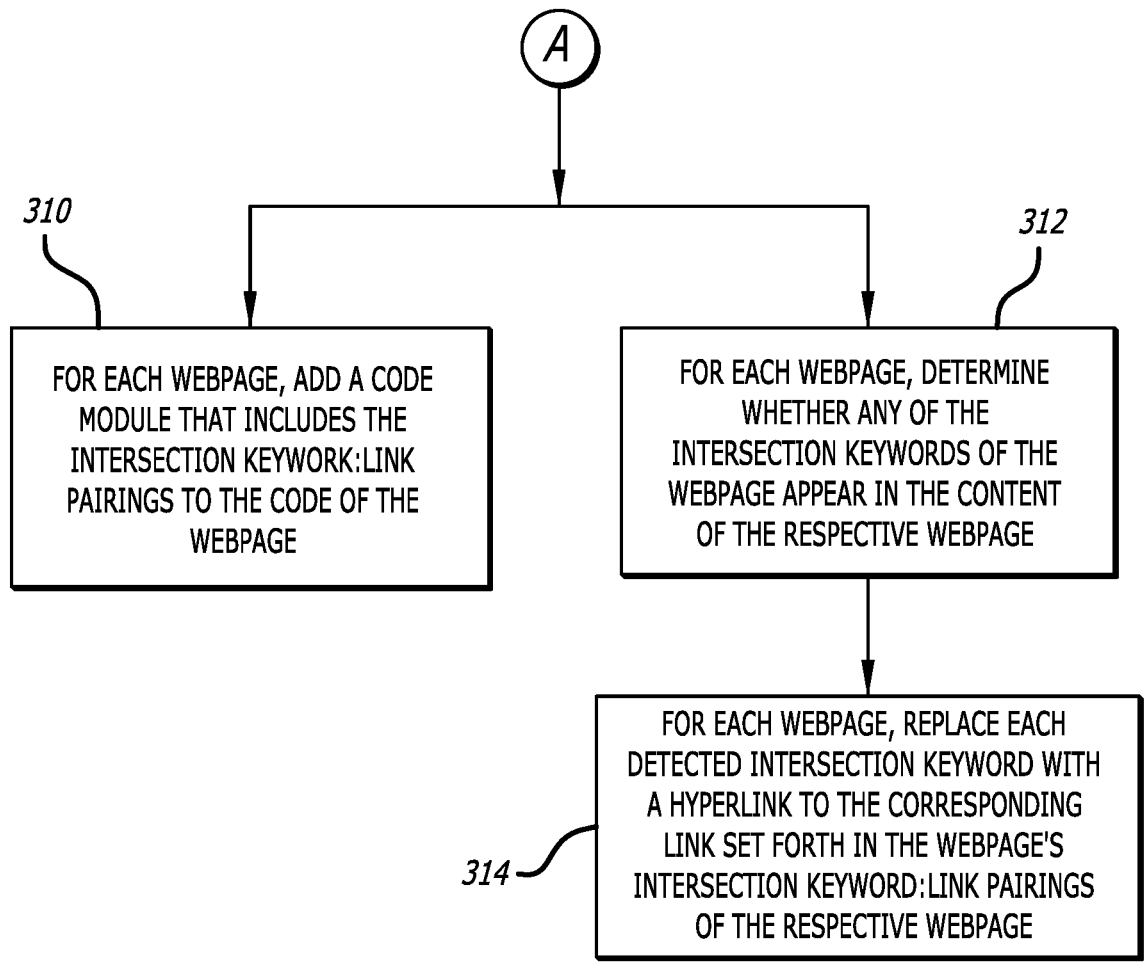

Referring now to FIGS. 3A-3B, a flowchart illustrating the organizational flow of FIGS. 2A-2G is shown according to some embodiments. Each block illustrated in FIGS. 3A-3B represents an operation performed in the method 300 of intelligently inserting links into web code of webpages that comprise a website by the website linking system. As an initial operation, the website linking system extracts the keywords from each webpage of the website to create a list of keywords for each webpage (block 302). Upon extracting the keywords for each webpage, the website linking system saves a link for each of the webpages' keywords along with each keyword (block 304). As stated above, the link and keyword may be saved in a data frame, with each data frame being unique according to a column of keywords, within for example a table or data store. As a result, each keyword may be assigned to one or more addresses of webpages.

Following the creation of the list of keywords for each webpage, the website linking system obtains a list of keywords from competitors' webpages using data analytics (block 306). Subsequently, for each webpage of the website, the website linking system determines an intersection between the webpage's keywords and the keywords from the competitors' webpages, referred to as the "intersection keywords" for each webpage (block 308). Although not shown, an optional step in method 300 may include the prioritization of the keywords:link pairings of the intersection keywords. As discussed below with respect to FIG. 6, the prioritization may be directed at ranking keywords:link pairings according to calculated or approximated economic value ("projected" economic value), with higher ranked keywords:link pairings having a higher calculated or approximated economic value. Thus, the prioritization of the keywords:link pairings of the intersection keywords may provide guidance during a keyword replacement process, discussed below, in order to replace keywords within content of a webpage with links having the highest ranked link pairing.

Referring now to FIG. 3B, the determination of a link for each of the webpages' intersection keywords, the website linking system may perform either or both of (1) a first step including insertion of a code module to one or more webpages (block 310), and/or (2) a second step of replacing keywords in the content of each webpage with corresponding links (blocks 312 and 314). Referring to one optional step, the website linking system may insert a code module into the web code of each webpage of the website (block 310). Specifically, in one embodiment, the replacement operation includes generating a code module for each webpage that includes the intersection keyword:link pairings. Following the generation of the code module for a first webpage, the website linking system inserts the code module of the first webpage into the web code of the first webpage (e.g., into the HTML code of the first webpage).

Referring to a second optional step, for each webpage of the website, the website linking system determines whether any of the intersection keywords of each webpage appear in the content of the respective webpage (block 312). Subsequently, for each webpage of the website, the website linking system replaces each detected intersection keyword with a hyperlink to the corresponding link set forth in the intersection keyword:link pairings of the respective webpage (block 314).

IV. Exemplary Parsing Embodiments

As discussed above, the website linking system may perform in-content replacement of intersection keywords with corresponding hyperlinks. For example, following the determination of an intersection keyword set for each webpage of a website and the determination and generation of intersection keyword:link pairings for each webpage, the website linking system may perform at least one of (i) code module insertion, and/or (ii) in-content keyword replacement. With respect to the in-content keyword replacement, the website linking system may either (1) parse the web code of a webpage (FIG. 4A-4B), or (2) parse the content of a loaded webpage (FIGS. 5A-5B).

Referring now to FIG. 4A, an illustrative embodiment of web code of a webpage that is parsed in order to detect a plurality of keywords is shown according to some embodiments. The web code 400 includes a snippet 402 of the web code that is parsable by the website linking system. Upon parsing the snippet 402, the website linking system detects example keyword 404$_1$ ("delicious meal") and example keyword 404$_2$ ("Thanksgiving setup").

With reference now to FIG. 4B, an illustrative embodiment of the web code of FIG. 4A wherein the plurality of detected keywords have been replaced by a corresponding hyperlink is shown according to some embodiments. The web code 400 is shown to include an updated snippet 406. Specifically, following the detection of keywords as illustrated in FIG. 4A, the website linking system replaces the detected keywords 404$_1$ and 404$_2$ with the corresponding links from the intersection keyword:link pairings for the webpage as discussed above. Specifically, as shown in the example embodiment, the website linking system parsed the snippet 402 of FIG. 4A and detected the keyword 404$_1$. Subsequently, the website linking system determined that the keyword 404$_1$ corresponds to the link 410$_1$ and replaced the keyword 404$_1$ with the code snippet 408$_1$, which includes the link 410$_1$. Similarly, the website linking system determined that the keyword 404$_2$ corresponds to the link 410$_2$ and replaced the keyword 404$_2$ with the code snippet 408$_2$, which includes the link 410$_2$.

Figure 5A:
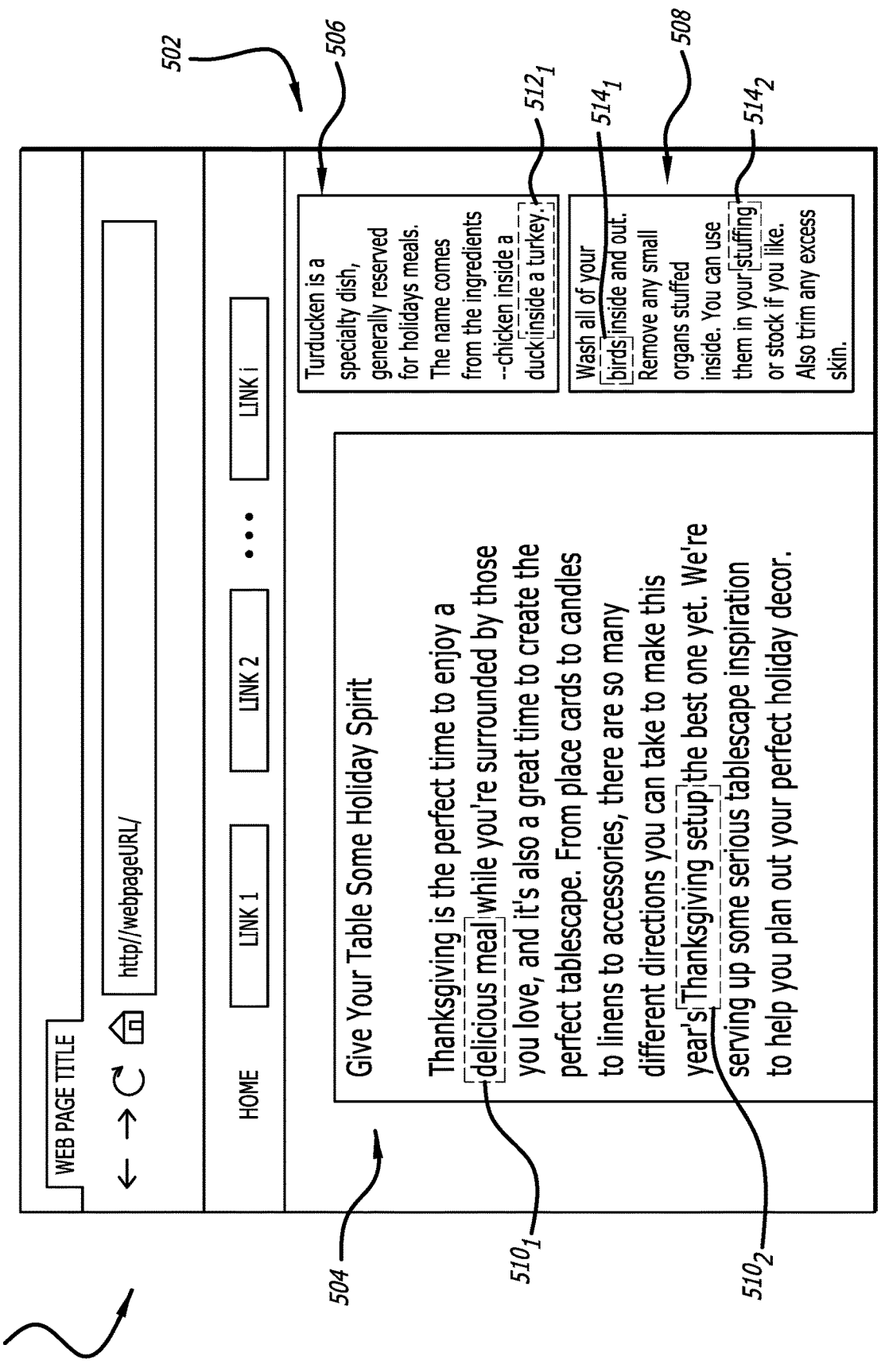
FIG. 5A is an illustrative embodiment of a web browser displaying a rendered webpage that is parsed in order to detect a plurality of keywords according to some embodiments.
Figure 5B:
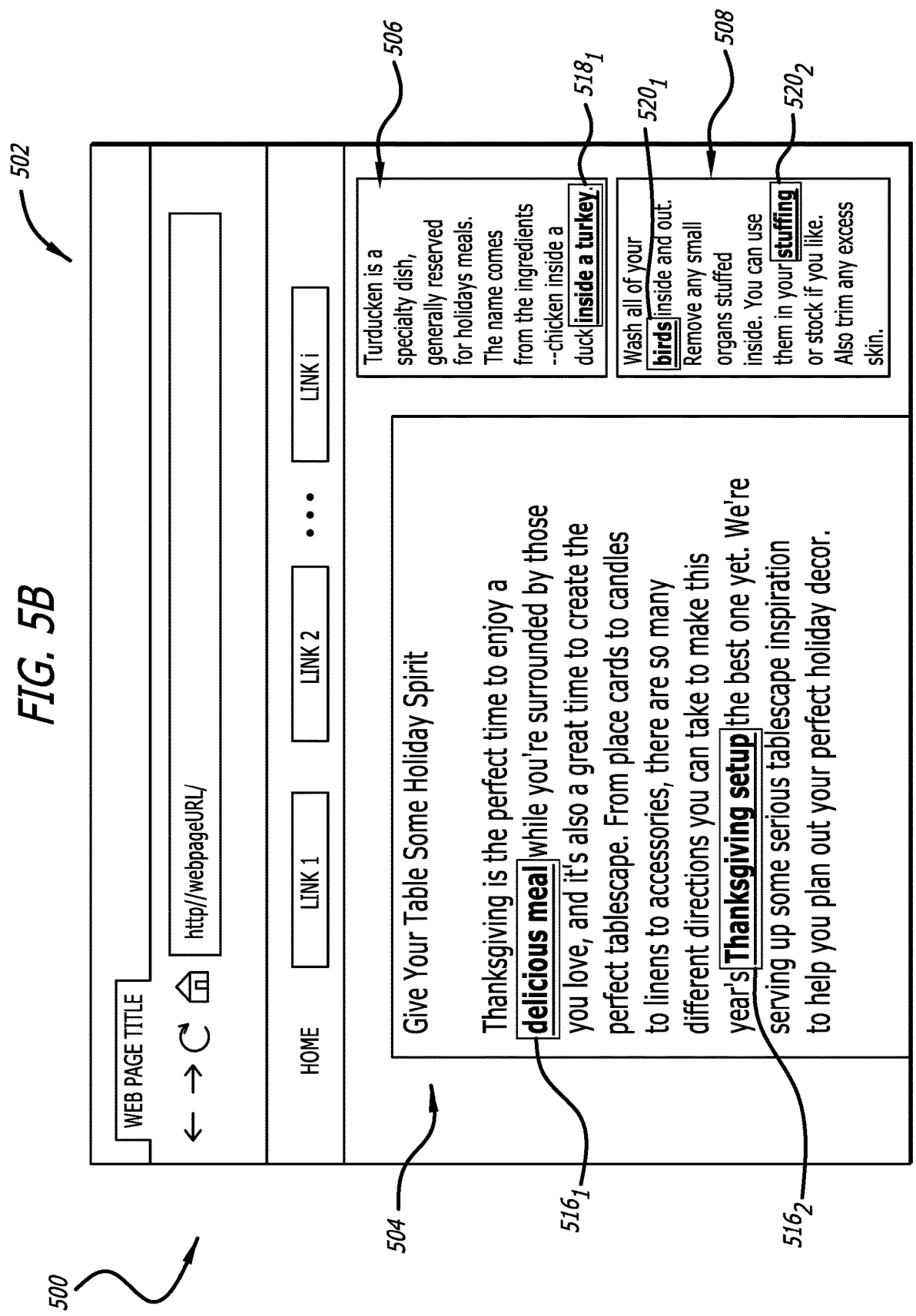
FIG. 5B is an illustrative embodiment of a web browser displaying the rendered webpage of FIG. 5A wherein the plurality of detected keywords have been replaced by a corresponding hyperlink according to some embodiments.

Referring to FIG. 5A, an illustrative embodiment of a web browser displaying a rendered webpage that is parsed in order to detect a plurality of keywords is shown according to some embodiments. The web browser 500 may be any web browser as is known to those having ordinary skill in the art. The web browser 500 may include a header section having user input elements (also referred to as "user input objects") configured to receive user input such as directional arrows, a refresh arrow and a home icon as well as a URL bar. The web browser 500 is utilized to render the webpage 502 which may be part of a collection of webpages forming a website. The webpage 502 is shown to include a first content section 504, a second content section 506 and a third content section 508. However, as webpages vary in formatting and structure, the disclosure is not intended to be limited to the embodiment illustrated in FIGS. 5A-5B. Instead, webpages as discussed herein may have any format and/or structure.

The content sections 504, 506 and 508 are shown to include text but may also include images, graphics or other content. In particular, the content section 504 includes text that is parsable by the website linking system, which, according to the embodiment, has detected example keywords including the keyword 510$_1$ and the keyword 510$_2$. Similarly, the content sections 506 and 508 have been parsed and the website linking system, according to the embodiment, has detected the keyword 512$_1$ in the content section 506 and the keywords 514$_1$ and 514$_2$ in the content section 508.

Referring to FIG. 5B, an illustrative embodiment of a web browser displaying the rendered webpage of FIG. 5A wherein the plurality of detected keywords have been replaced by a corresponding hyperlink is shown according to some embodiments. As has been previously discussed, subsequent to determining a set of intersection keywords for a webpage, generating intersection keyword:link pairings for the webpage and parsing the webpage to detect whether any of the intersection keywords appear in the content of the webpage, the website linking system replaces each detected keyword with the corresponding link as set forth in the intersection keyword:link pairings for the respective webpage. For example, as is seen in comparing FIGS. 5A and 5B, the keyword 510$_1$ "delicious meal" has been replaced by the hyperlink 516$_1$, which is rendered as an emphasized version of the text "delicious meal," in this case as bolded and underlined. However, the bolded and underlined emphasis embodiment as shown is merely one example as to how the hyperlink may be emphasized. Similarly, FIG. 5B also illustrates that the keywords 510$_2$, 512$_2$, 514$_1$ and 514$_2$ have all been replaced by the website linking system with their corresponding link.

Referring now to FIG. 6, an exemplary embodiment of a logical representation of a website linking system 614 is shown. The website linking system 614, in one embodiment, may be stored on a non-transitory computer-readable storage medium of an electronic device that includes a housing, which is made entirely or partially of a hardened material (e.g., hardened plastic, metal, glass, composite or any combination thereof) that protects the circuitry within the housing, namely one or more processor(s) 602 that are coupled to a communication interface 604 via a first transmission medium 606. The communication interface 604, in combination with a communication interface logic 612, enables communications with external network devices, such as network devices, not shown, which may display, for example, webpages of the website 100 of FIG. 1.

The processor(s) ("processor") 602 is further coupled to a persistent storage 610 via a second transmission medium 608. According to one embodiment of the disclosure, the persistent storage 610 may include the following logic as software modules: the webpage keyword determination logic 616, the competitors' keyword determination logic 618, the intersection keyword determination logic 620, the keyword:link pairing determination logic 622, the code module insertion logic 624, the in-content keyword replacement logic 626 and the optional parsing logic 632. Of course, it is contemplated that some or all of the logic modules of the website linking system 614 may be implemented as hardware, and if so, such logic could be implemented separately from each other.

In addition to the discussion above, some operations of these logic modules, upon execution by the processor 602, are described herein. The webpage keyword determination logic 616, when executed by the processor 602, causes the performance of operations including parsing a webpage and determining keywords for the webpage, wherein the keywords may be present in the content that appears on the webpage and/or keywords that relate to the content that appears on the webpage. In parsing the webpage, the webpage keyword determination logic 616 may incorporate parsing logic that parses webpage (e.g., web code and/or a loaded webpage). In an alternative embodiment, the webpage keyword determination logic 616 may call the parsing logic 632 to parse the content of the webpage. In determining the keywords for the webpage, the webpage keyword determination logic 616 may utilize predetermined rule sets that compare the content appearing on the webpage to a predefined set of keywords that may be stored in the data store 630. For example in one embodiment, while parsing the content appearing on a webpage, the webpage keyword determination logic 616 may compare words and/or phrases to a predefined set of keywords stored in the data store 630. The webpage keyword determination logic 616 may detect direct matches and implement natural language processing and machine learning techniques to detect phonetic matches, abbreviations and full forms, and/or synonyms.

The competitors' keyword determination logic 618, when executed by the processor 602, causes the performance of operations including obtaining keywords of competitors' webpages. In one embodiment, obtaining the keywords of competitors' webpages may be the result of the performance of a series of API calls to a third-party data analytics system, such as SpyFu®. In an alternative embodiment, the competitors' keyword determination logic 618 may parse competitors' webpages and analyze the content of the competitors' webpages to determine keywords therefor (e.g., through detection of direct matches of words and/or phrases appearing in the content with a predefined set of keywords, through the use of natural language processing and machine learning techniques to determine phonetic matches, abbreviations and full forms, and/or synonyms for words appearing in the content of the competitors' webpages and/or based on the content appearing on the competitors' webpages).

The intersection keyword determination logic 620, when executed by the processor 602, causes the performance of operations including comparing the keywords of a webpage with the keywords of competitors' webpages to determine an intersection (i.e., an overlap) of keywords appearing in both sets ("intersection keywords"). The intersection keyword determination logic 620 may detect direct matches in the two sets. In addition, the intersection keyword determination logic 620 may implement natural language processing and machine learning techniques to detect phonetic matches, abbreviations and full forms, and/or synonyms that appear in the two sets of keywords. The intersection keyword determination logic 620 determines a set of intersection keywords for all webpages within a given website.

The keyword:link pairing determination logic 622, when executed by the processor 602, causes the performance of operations including, for each webpage within the website, comparing the intersection keywords to a predefined set of links in order to determine a link for each intersection keyword. The keyword:link pairing determination logic 622 then generates intersection keyword:link pairings (for each webpage).

The code module insertion logic 624, when executed by the processor 602, causes the performance of operations including, for each webpage within the website, generating a code module that includes the intersection keyword:link pairings of the webpage and inserting the code module into the web code of the webpage. For example in one embodiment, the code module insertion logic 624 may insert the code module into the web code of a webpage so that, when the webpage is loaded by a visitor, the intersection keyword:link pairings appears at the bottom of the webpage, however, other locations on the webpage are within the scope of this disclosure.

The in-content keyword replacement logic 626, when executed by the processor 602, causes the performance of operations including, for each webpage within the website, determining whether any of the intersection keywords for the webpage appear in the content of the webpage. In one embodiment, the in-content keyword replacement logic 626 may incorporate parsing logic and parse either the content of the loaded webpage and/or the web code of the webpage. In other embodiment, the in-content keyword replacement logic 626 may call the parsing logic 632 to parse the content of the webpage. Following the parsing of the content of the webpage, the in-content keyword replacement logic 626 replaces the keyword with the corresponding link from the intersection keyword:link pairings for the webpage.

In some embodiments, the website linking system 614 may include a prioritization logic 628 that operates to prioritize one or more keyword:link pairings. The in-content keyword replacement logic 626 may replace a keyword detected within the content of a webpage based on the prioritization. For example, when in-content keyword replacement logic 626 has multiple keyword replacement candidates, the in-content keyword replacement logic 626 may select a keyword based on the ranking of each keyword replacement candidate. In some embodiments, the prioritization process may be directed at providing a higher priority (or "ranking") to keywords according to a calculated or approximated economic value. The prioritization process may utilize data analytics and consider factors such as, for example, known return on investment (ROI), conversion rate, number of "clicks" to a particular link, cost per "click" and search volume statistics.

The optional parsing logic 632 may be a separate logic module and/or may be incorporated into one or more of the logic modules discussed above. Additionally, the keyword data store 630 includes stored data for access by the any of the logic modules of the website linking system 614.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. An automated system for inserting links to one or more webpages of a website, the automated system comprising:
   a server device including one or more processors, a non-transitory computer-readable storage medium and instructions stored thereon, the instructions being executable by the one or more processors to perform operations including:
   detecting a first set of keywords for a first webpage of the website;
   determining a second set of keywords for webpages external to the website;
   determining, for the first webpage, a set of intersection keywords by determining an overlap of keywords in both (i) the first set of keywords, and (ii) the second set of keywords,
   generating first intersection keyword:link pairings by determining a corresponding link for each intersection keyword of the first webpage;
   inserting a code module into web code of the first webpage, the code module including the first intersection keyword:link pairings;
   determining whether one or more of the intersection keywords appear in content of the first webpage;
   replacing each intersection keyword detected in the content of the first webpage with a link from the first intersection keyword:link pairings that corresponds to the detected intersection keyword;
   causing display of the first webpage on a display screen of a network device including the link from the first intersection keyword:link pairings of the code module that corresponds to the detected intersection keyword.

2. The automated system of claim 1, further comprising:
   prior to inserting the code module into the web code of the first webpage, prioritizing each keyword of the first intersection keyword:link pairings based on at least one of usage frequency of each link, search volume for each keyword, projected economic value of each link, and advertising costs for each keyword.

3. The automated system of claim 1, wherein determining whether one or more of the intersection keywords appear in the content of the first webpage includes either (i) parsing the web code of the first webpage, or (ii) parsing the content of the first webpage while in a loaded state.

4. The automated system of claim 1, wherein a keyword includes a word or a phrase including a set of words.

5. The automated system of claim 1, wherein the link is a hyperlink directed to a second webpage of the website.

6. The automated system of claim 1, wherein the link is a hyperlink directed to a webpage that is external to the website.

7. The automated system of claim 1, wherein determining the set of intersection keywords is through at least one of machine-learning techniques or predetermined rule sets.

8. The automated system of claim 1, wherein the intersection includes at least one of (i) a direct match of a first keyword in the first set of keywords and a second keyword in the second set of keywords, (ii) a phonetic match of the first keyword in the first set of keywords and the second keyword in the second set of keywords, (iii) a match being an abbreviation with a full form of a word or phrase of the first keyword in the first set of keywords and the second keyword in the second set of keywords, or (iv) synonyms in the first keyword in the first set of keywords and the second keyword in the second set of keywords.

9. A non-transitory computer readable storage medium having stored thereon instructions, the instructions being executable by one or more processors to perform operations including:
  detecting a first set of keywords for a first webpage of a website, the website including a set of webpages;
  determining a second set of keywords for webpages external to the website;
  determining, for the first webpage, a set of intersection keywords by determining an overlap of keywords in both (i) the first set of keywords, and (ii) the second set of keywords,
  generating first intersection keyword:link pairings by determining a corresponding link for each intersection keyword of the first webpage;
  inserting a code module into web code of the first webpage, the code module including the first intersection keyword:link pairings;
  determining whether one or more of the intersection keywords appear in content of the first webpage;
  replacing each intersection keyword detected in the content of the first webpage with a link from the first intersection keyword:link pairings that corresponds to the detected intersection keyword;
  causing display of the first webpage on a display screen of a network device including the link from the first intersection keyword:link pairings of the code module that corresponds to the detected intersection keyword.

10. The non-transitory computer readable storage medium of claim 9, further comprising:
  prior to inserting the code module into the web code of the first webpage, prioritizing each keyword of the first intersection keyword:link pairings based on at least one of usage frequency of each link, search volume for each keyword, projected economic value of each link, and advertising costs for each keyword.

11. The non-transitory computer readable storage medium of claim 9, wherein a keyword includes a word or a phrase including a set of words.

12. The non-transitory computer readable storage medium of claim 9, wherein determining the set of intersection keywords is through at least one of machine-learning techniques or predetermined rule sets.

13. The non-transitory computer readable storage medium of claim 9, wherein the link is a hyperlink directed to either (i) a second webpage of the website, or (ii) a webpage that is external to the website.

14. A computerized method for inserting links to one or more webpages of a website, the computerized method including:
  detecting a first set of keywords for a first webpage of a website;
  determining a second set of keywords for webpages external to the website;
  determining, for the first webpage, a set of intersection keywords by determining an overlap of keywords in both (i) the first set of keywords, and (ii) the second set of keywords,
  generating first intersection keyword:link pairings by determining a corresponding link for each intersection keyword of the first webpage;
  inserting a code module into web code of the first webpage, the code module including the first intersection keyword:link pairings;
  determining whether one or more of the intersection keywords appear in content of the first webpage;
  replacing each intersection keyword detected in the content of the first webpage with a link from the first intersection keyword:link pairings that corresponds to the detected intersection keyword;
  causing display of the first webpage on a display screen of a network device including the link from the first intersection keyword:link pairings of the code module that corresponds to the detected intersection keyword.

15. The computerized method of claim 14, further comprising:
  prior to inserting the code module into the web code of the first webpage, prioritizing each keyword of the first intersection keyword:link pairings based on at least one of usage frequency of each link, search volume for each keyword, projected economic value of each link, and advertising costs for each keyword.

16. The computerized method of claim 14, wherein determining whether one or more of the intersection keywords appear in the content of the first webpage includes either (i) parsing the web code of the first webpage, or (ii) parsing the content of the first webpage while in a loaded state.

17. The computerized method of claim 14, wherein a keyword includes a word or a phrase including a set of words.

18. The computerized method of claim 14, wherein determining the set of intersection keywords is through at least one of machine-learning techniques or predetermined rule sets.

19. The computerized method of claim 14, wherein the link is a hyperlink directed to either (i) a second webpage of the website, or (ii) a webpage that is external to the website.

20. The computerized method of claim 14, wherein the intersection includes at least one of (i) a direct match of a first keyword in the first set of keywords and a second keyword in the second set of keywords, (ii) a phonetic match of the first keyword in the first set of keywords and the second keyword in the second set of keywords, (iii) a match being an abbreviation with a full form of a word or phrase of the first keyword in the first set of keywords and the second keyword in the second set of keywords, or (iv) synonyms in the first keyword in the first set of keywords and the second keyword in the second set of keywords.

\* \* \* \* \*